April 7, 1931.  W. A. BATES  1,800,045
COUPLING
Filed July 10, 1929  2 Sheets-Sheet 1
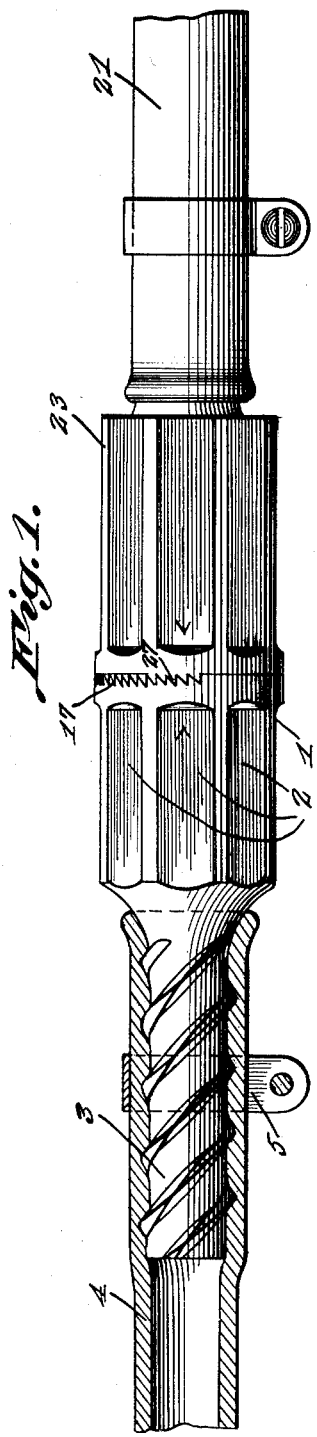
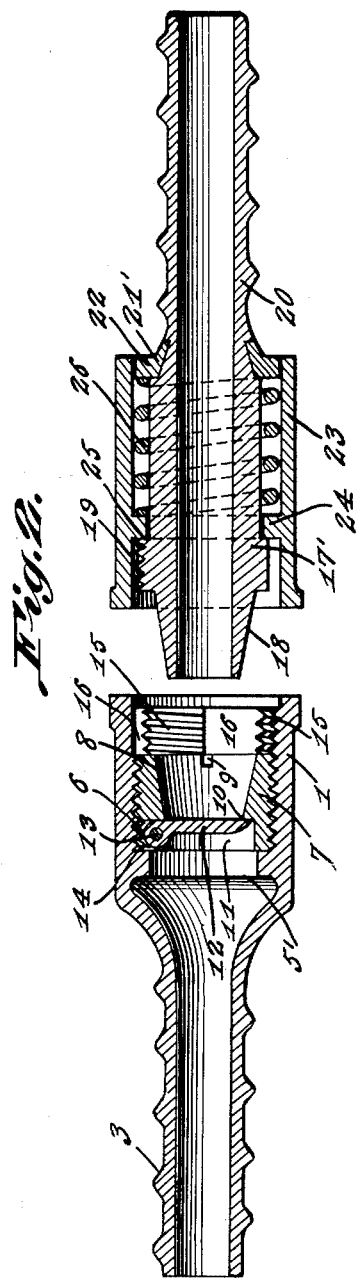
W. A. Bates, INVENTOR
BY Victor J. Evans
ATTORNEY April 7, 1931.  W. A. BATES  1,800,045
COUPLING
Filed July 10, 1929   2 Sheets-Sheet 2
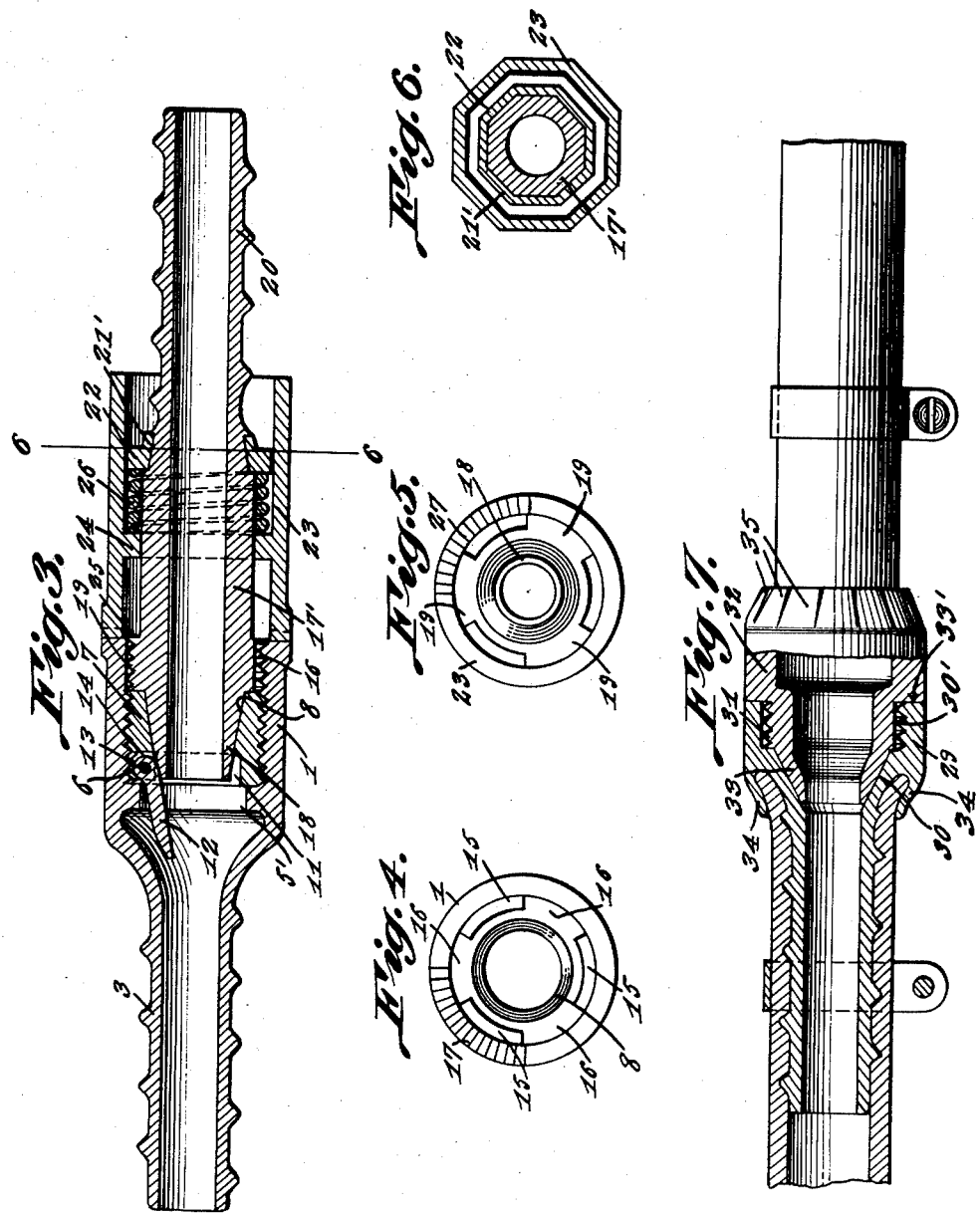
W. A. Bates, INVENTOR
BY Victor J. Evans
ATTORNEY Patented Apr. 7, 1931

1,800,045

UNITED STATES PATENT OFFICE

WILLIAM A. BATES, OF STONEHAM, MASSACHUSETTS

COUPLING

Application filed July 10, 1929. Serial No. 377,233.

My present invention relates to a new and novel coupling especially adapted to a compressed air hose, a garden hose or a fire hose, and the primary object of my invention is to provide a quick acting coupling which will effectively connect the hose sections or ends to provide an air and water tight joint therebetween, which cannot become accidentally loosened, or disassociated, which will require no twisting of the hose in the coupling thereof and which will also provide an automatic shut-off when the coupling is disconnected and thereby overcome waste of water or air due to the time required to shut off flow when one of the coupling members is disassociated from the other or when an additional hose is added to the line.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is a side elevation of two air or water conducting hose sections coupled in accordance with this invention.

Figure 2 is a central longitudinal sectional view through the coupling showing the parts thereof disassociated but arranged in longitudinal alinement.

Figure 3 is a sectional view similar to Figure 2 but showing the coupling sections associated.

Figure 4 is an end view of one of the coupling members.

Figure 5 is a similar view of the cooperating coupling member.

Figure 6 is a transverse section on the line 6—6 of Figure 3.

Figure 7 is a side elevation with parts broken away and parts in section to illustrate a modified form of coupler which is employed in connecting the ends of water conducting hose only.

The tubular end or head of the female member of my improved coupler is indicated in the drawings by the numeral 1. As disclosed by the drawings the upper peripheral face of the coupling head 1 is formed with angularly disposed flattened surfaces 2 whereby the coupling may be readily gripped and also whereby the usual exteriorly threaded or corrugated reduced stem extension 3 may be inserted in the end of a hose section 4. A clamping member 5 holds the hose on the stem.

The head 1, adjacent to its juncture with its reduced stem 3 is interiorly formed with an annular or ring enlargement 5' and outward thereof the bore of the female coupling 1 is interiorly threaded, as at 6.

Screwed in the head 1 and having its inner end contacting with the outer face of the ring flange 5' there is a tubular member 7. This member, from its outer end has a flared bore 8 and its said outer end is notched, as at 9, to receive therein a suitable tool whereby the said member may be screwed in the head. The flared bore 8 of the member 7 merges into a straight shoulder or face 10, the same being provided by enlarging and forming the said member 7 from its said inner end with a straight bore 11. The straight wall or shoulder 10 affords a seat for a flat valve 12. This valve is pivoted, as at 13, between the walls of a notch 14 formed on the inner end of the tubular member 7 that affords the valve seat. The valve 12 may be limited in its outward swinging by contact with the ring flange 5' but when the coupling head 1 is arranged in one position the valve 12 will swing by gravity against its seat and also when a pressure is exerted upon the outer face of the valve the same will be forced against its seat.

The threads on which the tubular valve seat 7 is screwed in the coupling head 1 may be continuous but outward of the said head the threads are divided by being cut-away longitudinally at preferably three equidistantly spaced points, the outer series of spaced threads being for distinction indicated by the numeral 15 and the spaces between the threads by the numeral 16. The head 1 of the female coupling at its outer end is formed for a suitable distance with incut teeth 17, which teeth describe straight walls or shoulders and angle connecting walls between the said straight walls.

The male coupling member is indicated by the numeral 17' and this coupler member 17' has a tapered end 18 to be received in the tapered bore 8 of the tubular member 7. The tapered end is of a greater length than that of the flared bore 8 so that the said male member will contact with the valve 12 and unseat the same when the male and female members are connected. The male coupling 17', inward of its flared end, is formed with an annular enlargement that is circumferentially provided with a series of spaced threads 19 whose ends are spaced away from each other. These spaced threads are of a length approximately corresponding to that of the spaces 16 between the threads 15 so it will be apparent that by passing the threaded portions 19 of the male member through the said spaces 16 of the female member and after turning the male coupling in the female coupling the said male and female members will be effectively coupled and that the valve 12, as previously stated, will be unseated.

The male coupling member is provided with the usual reduced stem 20 that receives thereover and has clamped on the screws or threads thereof the pipe section 21 which is to be connected to the pipe section 4. At a suitable distance from its enlarged and threaded portion 18 the male coupler member is peripherally formed with an outwardly flared depression whose walls are cut angularly, and in the showing of the drawings, the said walls being eight in number and, therefore, this portion of the head 17' is of octagonal formation. Squeezed on the flared wall between the stem 20 and the head 17' there is the flange 21' of a disc 22 that affords a stop element whose periphery is of octagonal formation. Arranged over the stop member 22 there is a slidable sleeve 23 which is provided with an inner ring flange 24 to contact with the shoulder 25 provided at the inner enlarged portion of the head that is formed with the peripheral spaced threads 19. From the annular flange or shoulder 25 the bore of the sleeve 23 is of octogonal formation so that the same can slide over but cannot rotate upon the stop member 22. Surrounding the head 17 and exerting a pressure between the stop member 22 and the lug or flange 24 on the sleeve 23 there is a helical spring 26 which forces the sleeve outwardly with respect to the head or to the position illustrated on the right hand side of Figure 2 of the drawings. The sleeve 23 is provided on its outer edge with a series of outstanding teeth 27, which are shaped similarly to those of the teeth 17 and which correspond in number with the said teeth 17. The teeth 27 and the sleeve 23 are arranged to aline with the teeth 17 on the female coupler member 1 when the coupling members are associated and the spring 26 will influence the sleeve 23 to force the teeth thereof into engagement with the teeth 17 and in this manner it will be noted that the coupling members cannot be accidentally disassociated. If desired coupling members similar to those previously described may be arranged upon the ends of the hose sections and the valve of the female coupling member will automatically close when pressure is exerted thereagainst so that additional sections may be connected to the ends of the hose sections 4 and 21 without liability of water or air flowing through the said hose sections. It will be further apparent that a nozzle may be connected with the outer female coupling section whether the nozzle is provided with a continuous or mutilated threaded portion.

In Figure 7 I have disclosed a construction which is designed for use in connection with garden or fire hose. The female coupling member is indicated by the numeral 29 and has a flared bore 30 between its head and stem. Outward of the bore the head of the female member 29 is provided with spaced or mutilated threads 30' to engage with similar threads 31 on the male coupler member 32. The male coupler member, outward of its threads 31 is provided with a flared portion 33 that finds a seat in the flared wall 30. From its threads the male coupler member 32 is enlarged so that the shoulder or face 33' thus provided will abut with the outer end of the female coupling member 29. Both of the coupling members at the headed portions thereof are formed with inner series of bendable fingers 34 provided by slitting inwardly inclined or flared extensions 35 that are integrally formed with the heads of the coupling members 29 and 32. These bendable fingers 34 are spaced from the flared outer faces of the coupling heads at their juncture with the stems therefor, and provide with the said flared portions spaces in which the ends of the hose sections are received. The fingers are now bent tightly against the hose sections to more effectively hold the said hose sections on the coupling members.

Having described the invention, I claim:

1. A hose coupling comprising a tubular male member and a tubular female member, said male member having a tapered end and having a peripheral series of outstanding threads inward of said end and the ends of the series of threads being spaced from each other, said female member having removably and adjustably secured therein a tubular member provided with a tapered bore for the tapered end of the male member, a flap valve hung from said tubular member and designed to be opened when contacted by the tapered end of the male member, said female member, outward of its seat having a peripheral series of threads whose confronting ends are spaced, and which threads are designed to engage with the threads of the male member after the threads of one of the members have been passed through the spaces between the threads of the cooperating member and the members have been turned one on the other.

2. A hose coupling comprising a tubular male member and a tubular female member, said male member having a tapered end and a peripheral series of threads inward of said ends and the confronting ends of the threads being spaced, said female member having removably and adjustably secured thereon a tubular seat provided with a tapered bore for the tapered end of the male member, a flap valve hung from said seat and designed to be opened when contacted by the tapered end of the male member, said female member outward of its seat having a peripheral series of spaced threads to be engaged by the threads of the male member when the threads are brought into register by the threads on one of the members being inserted through the spaces between the threads on the other member and the said members are turned one on the other, and a spring influenced element slidably arranged on the male member for coengagement with the female member when the couplings are associated.

3. A hose coupling comprising a tubular male member and a tubular female member, said male member having a tapered end and a peripheral series of threads inward of said ends and the confronting ends of the series of threads being spaced, said female member having removably and adjustably secured thereon a tubular seat provided with a tapered bore for the tapered end of the male member, a flap valve hung from said seat and designed to be opened when contacted by the tapered end of the male member, said female member, outward of its seat having a peripheral series of spaced threads to be engaged by the threads of the male member when the threads of one of the members are received through the spaces between the threads of the cooperating member and the members are turned one on the other, said female member having its outer edge formed with a series of incut teeth, a sleeve slidable on the male member, guide and stop means for the sleeve, a spring influencing the sleeve outwardly with respect to the male member and said sleeve having its outer edge formed with outstanding teeth to coengage with the teeth of the female member when the coupling members are coupled.

In testimony whereof I affix my signature.

WILLIAM A. BATES.